US012478302B2

(12) United States Patent
Nakagami et al.

(10) Patent No.: US 12,478,302 B2
(45) Date of Patent: Nov. 25, 2025

(54) PUNCTURING TOOL FOR SMALL ANIMALS

(71) Applicant: NIPRO CORPORATION, Osaka (JP)

(72) Inventors: Hiroyuki Nakagami, Osaka (JP); Tatsuya Kudo, Osaka (JP); Naoya Kataoka, Osaka (JP); Eimi Yoshida, Osaka (JP)

(73) Assignee: NIPRO CORPORATION, Osaka (JP)

( * ) Notice: Subject to any disclaimer, the term of this patent is extended or adjusted under 35 U.S.C. 154(b) by 1085 days.

(21) Appl. No.: 17/427,314

(22) PCT Filed: Jan. 31, 2020

(86) PCT No.: PCT/JP2020/003726
§ 371 (c)(1),
(2) Date: Oct. 25, 2021

(87) PCT Pub. No.: WO2020/158929
PCT Pub. Date: Aug. 6, 2020

(65) Prior Publication Data
US 2022/0117527 A1 Apr. 21, 2022

(30) Foreign Application Priority Data
Feb. 1, 2019 (JP) ................. 2019-016974

(51) Int. Cl.
*A61B 5/151* (2006.01)
*A61B 5/15* (2006.01)
(Continued)

(52) U.S. Cl.
CPC ............... *A61B 5/151* (2013.01); *A61D 1/00* (2013.01)

(58) Field of Classification Search
CPC ..... A61B 5/151; A61B 1/00; A61B 5/150503; A61B 5/150343; A61B 5/15003;
(Continued)

(56) References Cited

U.S. PATENT DOCUMENTS

| 4,393,882 A | 7/1983 | White | |
|---|---|---|---|
| 2002/0128604 A1* | 9/2002 | Nakajima | A61M 39/0693 604/167.04 |
| 2004/0158208 A1* | 8/2004 | Hiejima | A61M 39/26 604/167.04 |

FOREIGN PATENT DOCUMENTS

| EP | 2 774 596 A1 | 9/2014 |
|---|---|---|
| JP | 2004-242762 A | 9/2004 |

(Continued)

OTHER PUBLICATIONS

Nov. 14, 2022 Office Action issued in Indian Patent Application No. 202117039187.
(Continued)

*Primary Examiner* — Justin Xu
(74) *Attorney, Agent, or Firm* — Oliff PLC

(57) ABSTRACT

A puncturing tool for small animals which has a novel structure, facilitates confirmation of the connection state of a capillary tube, and can prevent inadvertent detachment of the capillary tube. A puncturing tool for small animals includes a connecting part for a capillary tube on the proximal end side of a hollow needle, wherein the connecting part has a tapered peripheral wall that expanding and extending in a direction away from the hollow needle, and a tapered peripheral wall has an elastic fitting part, through which the capillary tube is inserted, projecting inward from a middle portion of the tapered peripheral wall in the length direction thereof.

18 Claims, 6 Drawing Sheets

(51) Int. Cl.
   *A61B 5/153*   (2006.01)
   *A61D 1/00*    (2006.01)
   *A61M 5/34*    (2006.01)
   *A61B 5/155*   (2006.01)

(58) Field of Classification Search
   CPC ..... A61B 5/15074; A61B 5/153; A61B 5/155;
                                                A61M 5/34
   See application file for complete search history.

(56)           References Cited

FOREIGN PATENT DOCUMENTS

WO        2013/065292 A1    5/2013
   WO        2019/003358 A1    1/2019

OTHER PUBLICATIONS

Nov. 6, 2023 Office Action issued in Japanese Patnet Application No. 2020-568631.
Mar. 17, 2020 Search Report issued in International Patent Application No. PCT/JP2020/003726.
Jul. 27, 2021 International Preliminary Report on Patentability issued in International Patent Application No. PCT/JP2020/003726.
Apr. 30, 2024 Office Action issued in Japanese Patent Application No. 2020-568631.
Mar. 27, 2020 Search Report issued in International Patent Application No. PCT/JP2020/003726.

* cited by examiner

PUNCTURING TOOL FOR SMALL ANIMALS

TECHNICAL FIELD

The present invention relates to a puncturing tool for small animals used for collecting blood from small animals or the like.

BACKGROUND ART

Conventionally, when a small animal such as a mouse is subjected to percutaneous blood collection or other treatment, a puncturing tool for small animals, which is different from that for human bodies, has been used. This is because for small animals, unlike the case of targeting the human bodies, the amount of blood collected is very small, and it is necessary to puncture a narrow tail vein of the mouse or the like.

A puncturing tool for small animals having a conventional structure is disclosed in U.S. Pat. No. 4,393,882 (Patent Document 1). Specifically, a round tubular elastic tube is provided on the proximal end side of the small-diameter hollow needle, and a small-diameter capillary tube (a hematocrit capillary tube) can be connected from the opening end of the elastic tube. Then, by puncturing a vein or the like of a small animal with the hollow needle, a small amount of blood can be collected in a capillary tube via the hollow needle due to a capillary phenomenon.

However, when the inventors examined such a puncturing tool for small animals having a conventional structure, the inventors found that the said puncturing tool has new and unknown problems.

For example, with the puncturing tool for small animals having a conventional structure, it is difficult to know that the capillary tube is correctly connected when the capillary tube is inserted into and connected to the elastic tube provided on the proximal end side of the hollow needle. Therefore, the capillary tube may be insufficiently inserted and fall off, while the excessive insertion of the capillary tube may cause breakage.

In addition, when puncturing is performed with the capillary tube inserted into the elastic tube and connected to the hollow needle, the capillary tube that touches the operator's finger tends to incline at the connected site to the elastic tube, thereby making it difficult to reliably obtain the stable sealing properties at the connected site. Especially when puncturing a small animal, the puncture angle of the hollow needle may be small, and it may be easier to operate if the capillary tube is allowed to incline. However, with the puncturing tool for small animals having a conventional structure, it is difficult to allow the inclination of the capillary tube and to reliably obtain the stable sealing property in a compatible manner.

BACKGROUND ART DOCUMENT

Patent Document

Patent Document 1: U.S. Pat. No. 4,393,882

SUMMARY OF THE INVENTION

Problem the Invention Attempts to Solve

It is therefore an object of the present invention to provide a puncturing tool for small animals with a novel structure which is able to make it easy to grasp the connection status of the capillary tube and to prevent the capillary tube from accidentally falling off.

Means for Solving the Problem

A first preferred embodiment of the present invention provides a puncturing tool for small animals including a hollow needle and a connecting part for a capillary tube, the connecting part being provided on a proximal end side of the hollow needle, wherein the connecting part has a tapered peripheral wall expanding and extending in a direction away from the hollow needle, and the tapered peripheral wall includes an elastic fitting part configured to allow the capillary tube to be inserted, the elastic fitting part projecting inward from a lengthwise middle portion of the tapered peripheral wall.

With the puncturing tool for small animals of the present preferred embodiment, the insertion resistance of the capillary tube increases until the capillary tube passes through the elastic fitting part. However, after the capillary tube passes through the elastic fitting part, the insertion resistance of the capillary tube is generally constant. Therefore, in comparison with the puncturing tool having the conventional structure described in Patent Document 1 in which the insertion resistance of the capillary tube just gradually increases, a tactile feeling can be obtained in the insertion operation of the capillary tube, and the connection status of the capillary tube can easily be grasped. Moreover, by passing through the elastic fitting part, the retaining force due to the elasticity of the elastic fitting part is exerted on the capillary tube, thereby exhibiting the effect of preventing the capillary tube from accidentally falling off as well.

Moreover, since the connecting part has a tapered peripheral wall, the insertion operation of the capillary tube is facilitated, and the inner diameter on the opening end side of the connecting part, which is likely to come into abutment when the capillary tube inclines, can be made large, thereby allowing the inclination of the capillary tube.

Further, the internal volume of the connecting part on the distal end side with respect to the elastic fitting part, where the distal end portion of the capillary tube is to be inserted, is made small by the tapered peripheral wall. Thus, even if the collected blood or the like leaks at the connected site of the puncture needle and the capillary tube, the amount of leakage can be kept small.

A second preferred embodiment of the present invention provides a puncturing tool for small animals including a hollow needle and a connecting part for a capillary tube, the connecting part being provided on a proximal end side of the hollow needle, wherein the connecting part has a tubular peripheral wall extending in a direction away from the hollow needle, and the tubular peripheral wall includes an elastic fitting part projecting inward from a lengthwise middle portion of the tubular peripheral wall, and a projecting distal end portion of the elastic fitting part that projects inward is configured to be elastically deformed toward a distal end side in an axial direction of the tubular peripheral wall while being expanded by the capillary tube being inserted.

With the puncturing tool for small animals of the present preferred embodiment, the projecting distal end portion of the elastic fitting part is elastically deformed toward the distal end side in the axial direction due to the insertion of the capillary tube. This suppresses operating resistance due to the insertion of the capillary tube, thereby reducing damage to the capillary tube or the like. Moreover, the projecting distal end portion of the elastic fitting part is elastically deformed while being expanded due to the insertion of the capillary tube. This makes it possible to achieve reduction in the insertion resistance of the capillary tube as described above and good sealing properties between the elastic fitting part and the capillary tube in a compatible manner.

A third preferred embodiment of the present invention provides the puncturing tool for small animals according to the first or second preferred embodiment, wherein the elastic fitting part inclines toward a hollow needle side and projects inward.

With the puncturing tool for small animals of the present preferred embodiment, since the inclination direction of the elastic fitting part is the insertion direction of the capillary tube, the insertion resistance of the capillary tube through the elastic fitting part can be reduced. In addition, by inclining the elastic fitting part, it is also possible to increase the contact area with the capillary tube while reliably obtaining the softness of the elastic fitting part, thereby improving the holding performance and the sealing performance with respect to the capillary tube.

A fourth preferred embodiment of the present invention provides the puncturing tool for small animals according to any of the first through third preferred embodiments, wherein the elastic fitting part is tapered toward a projecting distal end side.

With the puncturing tool for small animals of the present preferred embodiment, the elastic fitting part is thinned especially in the vicinity of the contact part with the capillary tube so as to be easily deformed. As a result, for example, it becomes easy to deal with capillary tubes having different outer diameters. Further, at the time of inclination or displacement of the capillary tube as well, the vicinity of the contact part of the elastic fitting part with the capillary tube easily follows to deform, thereby making it possible to increase the allowable amount of movement of the capillary tube.

A fifth preferred embodiment of the present invention provides the puncturing tool for small animals according to any of the first through fourth preferred embodiments, wherein the elastic fitting part has a slit configured to be pushed to expand by the capillary tube being inserted.

With the puncturing tool for small animals of the present preferred embodiment, the expanding deformation of the slit makes it possible to easily deal with capillary tubes having different thicknesses, for example. Further, in the non-connected state of the capillary tube, by closing the slit, the proximal end side of the hollow needle can be closed or sufficiently narrowed at the connecting part. This increases a degree of freedom in selecting operations, for example, preventing blood leakage while connecting the capillary tube after puncturing with the hollow needle, or the like.

A sixth preferred embodiment of the present invention provides the puncturing tool for small animals according to any of the first through fifth preferred embodiments, wherein an inside of the tapered peripheral wall or the tubular peripheral wall on a hollow needle side with respect to the elastic fitting part constitutes a deformation allowance space configured to allow entrance of the elastic fitting part deformed by the capillary tube being inserted.

With the puncturing tool for small animals of the present preferred embodiment, the mode of deformation of the elastic fitting part when the capillary tube is inserted is stabilized by the deformation allowance space, thereby preventing irregular deformation. As a result, during the insertion operation of the capillary tube, it becomes possible to more stably obtain a tactile feeling due to the change in the insertion resistance before and after the capillary tube passing through the elastic fitting part as described above.

A seventh preferred embodiment of the present invention provides the puncturing tool for small animals according to any of the first through sixth preferred embodiments, wherein an internal volume of the tapered peripheral wall or the tubular peripheral wall is configured such that an internal volume on a hollow needle side with respect to the elastic fitting part is smaller than an internal volume on a proximal end opening side with respect to the elastic fitting part.

With the puncturing tool for small animals of the present preferred embodiment, the dead space inside the tapered peripheral wall or the tubular peripheral wall can be minimized without excessively hindering the inclination of the capillary tube. Further, even if the collected blood or the like leaks from the connected portion between the hollow needle and the capillary tube inside the tapered peripheral wall or the tubular peripheral wall, the volume of the portion up to the elastic fitting part is made small, so that it is also possible to minimize the amount of leaked and wasted blood or the like.

An eighth preferred embodiment of the present invention provides the puncturing tool for small animals according to any of the first through seventh preferred embodiments, wherein a proximal end portion of the hollow needle is provided with a needle hub, while a connecting member formed of a material softer than that of the needle hub is attached to the needle hub, and the connecting member extending from the needle hub to the proximal end side constitutes the connecting part.

With the puncturing tool for small animals of the present preferred embodiment, it is also possible to avoid damage to the capillary tube due to abutment against the connecting part or the like while reliably obtaining the supporting performance of the hollow needle by the needle hub.

A ninth preferred embodiment of the present invention provides the puncturing tool for small animals according to the eighth preferred embodiment, wherein a proximal end portion of the needle hub is provided with an abutting face configured to define an insertion position of the capillary tube by being abutted by a distal end face of the capillary tube inserted through the elastic fitting part.

With the puncturing tool for small animals of the present preferred embodiment, when inserting the capillary tube, the position of the most distal end of inserted tube can be more clearly grasped.

Effect of the Invention

According to the present invention, it is possible to provide a puncturing tool for small animals with a novel structure which is able to make it easy to grasp the connection status of the capillary tube and to prevent the capillary tube from accidentally falling off.

EMBODIMENTS FOR CARRYING OUT THE INVENTION

In order to clarify the present invention more specifically, practical embodiments of the present invention will be described in detail below in reference to the drawings.

Figure 1:
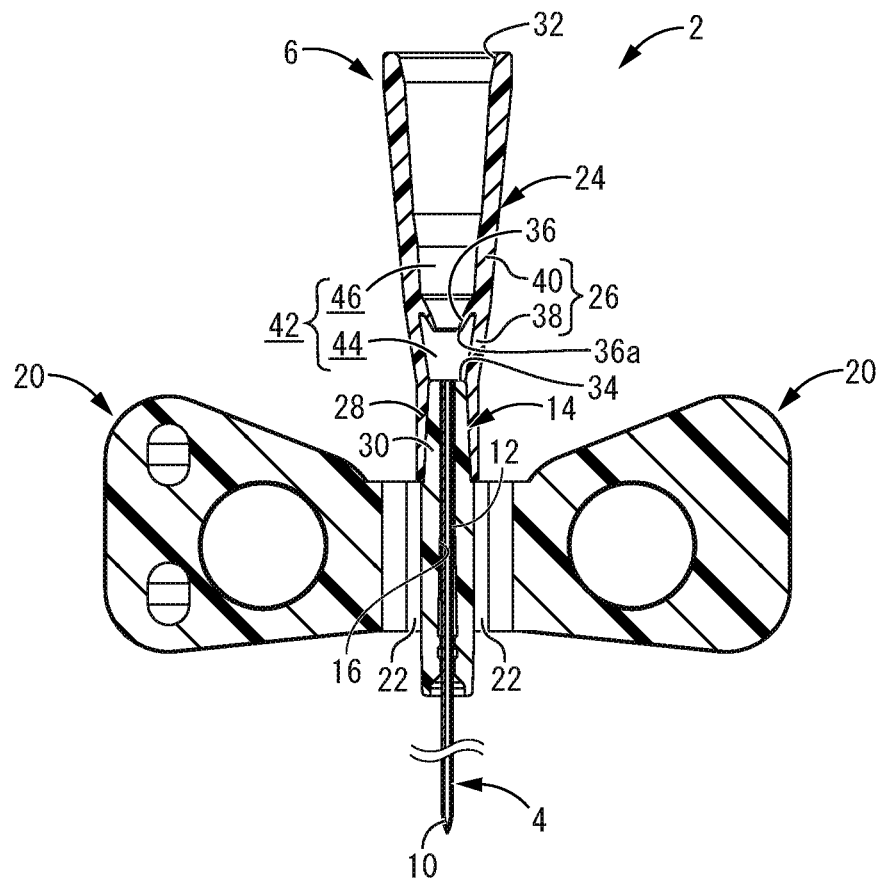
FIG. 1 is a vertical cross-sectional view showing a puncturing tool for small animals according to a first practical embodiment of the present invention, taken along line 1-1 of FIG. 2.
Figure 2:
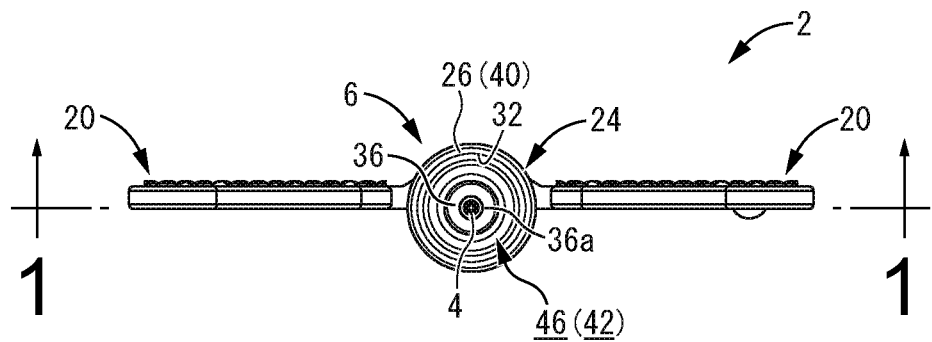
FIG. 2 is a rear view of the puncturing tool for small animals shown in FIG. 1.
Figure 3:
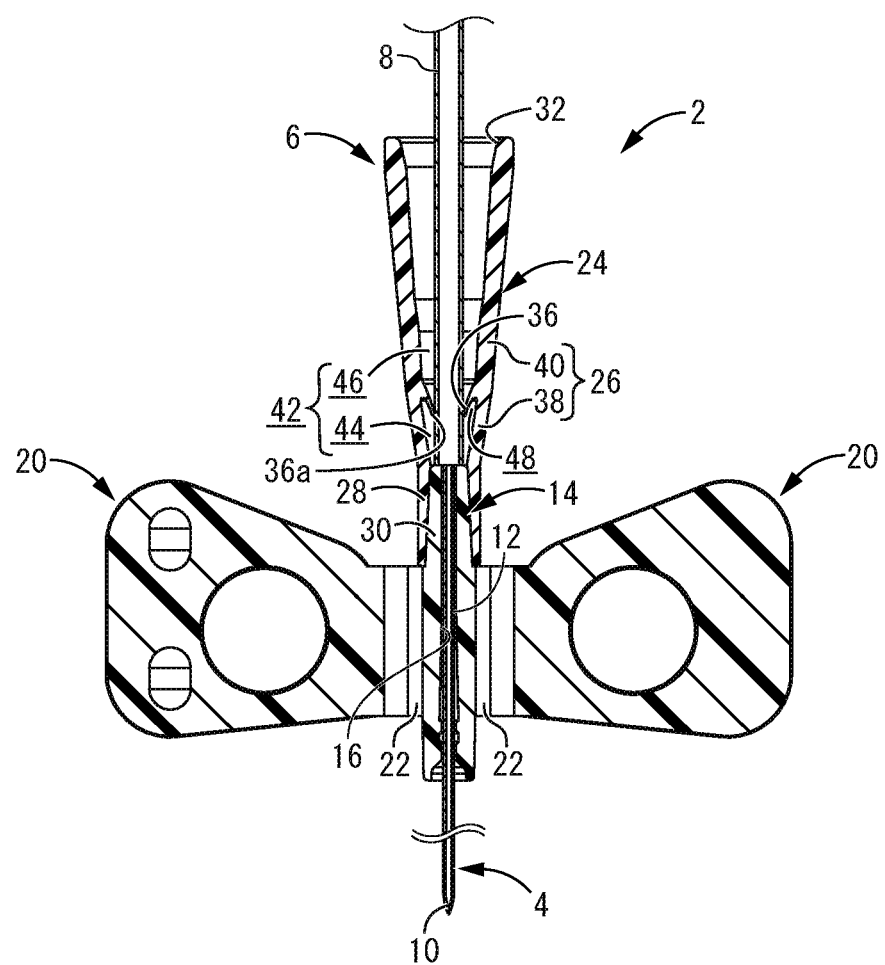
FIG. 3 is a vertical cross-sectional view of the puncturing tool for small animals shown in FIG. 1 which shows the connected state of a capillary tube.

First, FIGS. 1 and 2 show a puncturing tool 2 for small animals according to a first practical embodiment of the present invention. The puncturing tool 2 of the present practical embodiment includes a hollow needle 4 for puncturing, and a connecting part 6 is provided on the proximal end side of the hollow needle 4. As shown in FIG. 3, a capillary tube 8 is attachable and detachable with respect to the connecting part 6. In the following description, the axial direction refers to the needle axis direction of the hollow needle 4, and the distal end side and the proximal end side refer to the distal end side and the proximal end side of the hollow needle 4 in the needle axis direction, respectively.

Described more specifically, the hollow needle 4 has a hollow structure which is generally straight, and is provided with a sharp, pointed distal end 10. The hollow needle 4 has a small diameter for puncturing a small animal, and for example, a capillary phenomenon is also considered for blood collection. Preferably, a needle having a small diameter of, for example, 23 gauge or higher and made of a rigid material such as metal is used as the hollow needle 4.

A proximal end portion 12 of the hollow needle 4 is provided with a needle hub 14. The needle hub 14 has a generally round tubular shape overall, and the proximal end portion 12 of the hollow needle 4 is inserted into a central hole 16 of the needle hub 14 in a fastened state. The fastening structure of the hollow needle 4 to the needle hub 14 is not limited. For example, the hollow needle 4 can be fixed by press-fitting the hollow needle 4 into the central hole 16, but the hollow needle 4 can also be fastened by bonding, insert molding, or the like.

It is desirable that the proximal end portion 12 of the hollow needle 4 is arranged so as to pass through the needle hub 14. In the present practical embodiment, the proximal end face of the hollow needle 4 passes through so as to reach and be generally flush with a proximal end face 34 of the needle hub 14. This configuration avoids the occurrence of an unnecessary step in the central hole 16 of the needle hub 14 and the occurrence of a stepped state due to the protrusion of the hollow needle 4 from the needle hub 14.

In the present practical embodiment, the central hole 16 of the needle hub 14 is expanded on the distal end side, which facilitates manufacturing by press-fitting the hollow needle 4. Besides, the proximal end side of the central hole 16 has a small diameter over a predetermined length, and is fitted and fixed to the outer circumferential surface of the hollow needle 4. On the other hand, on the distal end side of the expanded central hole 16, an annular protrusion that protrudes on the inner circumferential surface and abuts against the outer circumferential surface of the hollow needle 4 is formed near the opening of the central hole 16, thereby improving the bearing capacity of the hollow needle 4.

Besides, the needle hub 14 is provided with wing-like parts 20 projecting on the outer circumferential surface. In the present practical embodiment, a pair of wing-like parts 20, 20 are provided so as to spread on both the left and right sides of the needle hub 14 in FIG. 1. The needle hub 14 is preferably made of synthetic resin, and the needle hub 14 is integrally molded with the pair of wing-like parts 20, 20. A linking part 22 of each wing-like part 20 to the needle hub 14 is thin and can be bent, and the pair of wing-like parts 20, 20 are configured to be gripped by the user with the fingertips of one hand by being overlapped with each other.

Moreover, a connecting member 24, which is a tubular separate member, is connected to the proximal end side of the needle hub 14. The connecting member 24 includes a tapered peripheral wall 26 having a circular tapered shape and serving as one type of a tubular peripheral wall. An attachment tube 28 having a generally round tubular shape extends from the small-diameter side end of the tapered peripheral wall 26 in the axial direction. The attachment tube 28 is fitted and fixed to a proximal end portion 30 of the needle hub 14 in an externally fitted state, and is bonded or the like as necessary. In the present practical embodiment, the proximal end portion 30 of the needle hub 14 has a tapered tubular shape whose outer diameter dimension gradually decreases toward the proximal end side.

With this configuration, the connecting member 24 extends outward from the proximal end side of the needle hub 14 generally coaxially with the needle hub 14, and a proximal end opening 32 having a large diameter constitutes an insertion slot of the capillary tube 8. Besides, a proximal end face 34 of the needle hub 14 is located within the small-diameter side end of the tapered peripheral wall 26. The proximal end face 34 comprises a generally flat surface extending in the axis-perpendicular direction, and constitutes an abutting face that can define the insertion end of the capillary tube 8 by being abutted by the distal end face of the capillary tube 8 inserted into the tapered peripheral wall 26.

The connecting member 24 is preferably made softer than the needle hub 14, and may be formed of, for example, polyvinyl chloride, isoprene rubber, or the like having elasticity. Further, it is desirable that the proximal end portion 30 of the needle hub 14 around which the attachment tube 28 of the connecting member 24 is externally fitted has a slightly tapered shape on its outer circumferential surface, thereby making it easy to externally fit the attachment tube 28.

Furthermore, in the present practical embodiment, the portion of the connecting member 24 extending from the needle hub 14 comprises the tapered peripheral wall 26 having a tapered inner and outer circumferential surface across generally the entire length. The tapered peripheral wall 26 includes an elastic fitting part 36 projecting from the inner circumferential surface in the lengthwise middle portion thereof.

The elastic fitting part 36 is made of an elastic material, and is integrally formed with the tapered peripheral wall 26 of the connecting member 24 in the present practical embodiment. Besides, the elastic fitting part 36 has a generally tapered tubular shape that inclines and projects toward the distal end side in the axial direction. Further, the elastic fitting part 36 has an inclination angle larger than that of the tapered peripheral wall 26, and is formed with a length that does not reach the small-diameter side end of the tapered peripheral wall 26.

In particular, the elastic fitting part 36 of the present practical embodiment has a vertical cross-sectional shape that tapers toward the projecting distal end side. That is, in the elastic fitting part 36, the thickness dimension of the distal end portion is smaller than the thickness dimension of the proximal end portion projecting from the tapered peripheral wall 26. Further, the minimum diameter of the projecting distal end of the elastic fitting part 36 is smaller than the outer diameter of the proximal end face 34 of the needle hub 14, which is the inner diameter of the small-diameter side end of the tapered peripheral wall 26.

Furthermore, the position of the elastic fitting part 36 is not limited to the lengthwise center of the tapered peripheral wall 26, but may be set to any lengthwise middle position of the tapered peripheral wall 26 except for the lengthwise opposite ends thereof. In the present practical embodiment, the elastic fitting part 36 is provided on the distal end side with respect to the lengthwise center of the tapered peripheral wall 26. That is, the tapered peripheral wall 26 includes a distal side tapered part 38 extending to the distal end side with respect to the elastic fitting part 36 and a proximal side tapered part 40 extending to the proximal end side with respect to the elastic fitting part 36, and the proximal side tapered part 40 is longer in the axial direction than the distal side tapered part 38.

The taper angle, wall thickness, and the like of the tapered peripheral wall 26 are not limited, but the taper angle, wall thickness, and the like may be partially varied in the length direction. In the present practical embodiment, in consideration of the strength of the peripheral wall, the guiding action of the capillary tube 8, the connection of a male luer 54 described later, and the like, the wall thickness of the proximal side tapered part 40 is made larger than that of the distal side tapered part 38, and the taper angle of the inner circumferential surface of the proximal side tapered part 40 is partially varied in the length direction.

Further, an internal space 42 of the tapered peripheral wall 26 includes a distal side internal space 44 located on the distal end side with respect to the elastic fitting part 36 and a proximal side internal space 46 located on the proximal end side with respect to the elastic fitting part 36. Since the elastic fitting part 36 is provided so as to be shifted to the distal end side, and in combination with the fact that the peripheral wall has a tapered shape, the distal side internal space 44 has an internal volume smaller than that of the proximal side internal space 46.

It is desirable that the volume of the distal side internal space 44 is set to be equal to or larger than the volume of the elastic fitting part 36. With this configuration, the distal side internal space 44 constitutes a deformation allowance space that configured to allow entrance of the elastic fitting part 36 deformed toward the distal end side due to insertion of the capillary tube 8, to reliably obtain a degree of freedom of deformation of the elastic fitting part, and to suppress increase in the insertion resistance of the capillary tube 8.

Further, it is desirable to set the shape and thickness of the elastic fitting part 36, the inner diameter of the distal side tapered part 38, and the like such that in the insertion state of the capillary tube 8 in which the elastic fitting part 36 is elastically deformed so as to be pushed into the distal side internal space 44, a gap 48 remains between the radially outer side of the elastic fitting part 36 and the distal side tapered part 38. With this configuration, even in the insertion state of the capillary tube 8, elastic deformation of the elastic fitting part 36 is easily allowed, thereby decreasing the insertion resistance of the capillary tube 8, increasing the allowable amount of movement of the capillary tube 8 in the axis-perpendicular direction, and the like.

The capillary tube 8 is configured to be connected to the puncturing tool 2 having the above-mentioned structure, and with the capillary tube 8 inserted and connected as illustrated in FIG. 3, the puncturing tool 2 is used, for example, as a puncturing tool for collecting blood from a small animal. Through tail prick of a mouse, the puncturing tool 2 is able to perform blood collection or the like from the tail vein utilizing capillary phenomenon.

In the puncturing tool 2, as shown in FIG. 3, the capillary tube 8 inserted in the axial direction from the proximal end opening 32 of the connecting member 24 passes through the proximal side internal space 46 of the tapered peripheral wall 26, and is further inserted in a state where the capillary tube 8 passes through the elastic fitting part 36 and reaches so far as the distal side internal space 44. By so doing, the distal end portion of the capillary tube 8 is inserted into the tapered peripheral wall 26 of the connecting member 24, and the outer circumferential surface thereof is elastically supported by the elastic fitting part 36, so as to be held in communication with the central hole of hollow needle 4. As will be appreciated from the above, in the present practical embodiment, the connecting part 6 of the capillary tube 8 is constituted by the tapered peripheral wall 26 of the connecting member 24 and the elastic fitting part 36.

Here, the outer diameter dimension of the capillary tube 8 is not limited, but is preferably be set such that the capillary tube 8 to be used as a suitable size is inserted so as to pass through the elastic fitting part 36, and the elastic fitting part 36 comes into generally close contact with the outer circumferential surface of the capillary tube 8 about the entire circumference. Specifically, it is desirable that the inner diameter of the elastic fitting part 36 is set to be equal to or less than the minimum outer diameter of the suitable capillary tube 8. Besides, it is desirable that the inner diameter dimension of the tapered peripheral wall 26 at the formation site of the elastic fitting part 36, which is the outer diameter dimension of the elastic fitting part 36, is set to be equal to or larger than the maximum outer diameter of the suitable capillary tube 8.

Then, the inserted capillary tube 8 is fitted and inserted through the elastic fitting part 36 by elastically deforming a projecting distal end portion 36a, which is especially decreased in diameter, so as to be bent or extended toward the distal end side in the axial direction while being pushed to expand radially outward. By so doing, due to the elastic recovering action of the elastic fitting part 36, the elastic fitting part 36 is pressed against the outer circumferential surface of the capillary tube 8 about the entire circumference so as to realize the sealed state. In particular, in the present practical embodiment, the elastic fitting part 36 inclines toward the distal end side with respect to the axis-perpendicular direction, and the projecting distal end portion 36a is elastically deformed so that the said inclination angle is larger. Therefore, in combination with the fact that the elastic fitting part 36 has a tapered cross-sectional shape, reduction in the insertion resistance of the capillary tube 8 and improvement in the sealing performance with the capillary tube 8 can be achieved.

Further, even in the insertion state of the capillary tube 8, due to elastic deformation of the elastic fitting part 36, inclination and movement of the capillary tube 8 are allowed while maintaining the sealed state. In addition, at the proximal end portion where the amount of movement of the capillary tube 8 in the axis-perpendicular direction increases during inclination of the capillary tube 8, the inner diameter of the proximal side tapered part 40 of the tapered peripheral wall 26 is made large. This will avoid an excessive limitation of the inclination of the capillary tube 8 due to abutment of the capillary tube 8 against the connecting member 24. Therefore, for example, when puncturing a small animal using the puncturing tool 2 to which the capillary tube 8 is inserted and connected, even if the finger touches the capillary tube 8 and the hollow needle 4 and the capillary tube 8 incline relative to each other, damage to the capillary tube 8 will be prevented.

In particular, in the present practical embodiment, the elastic fitting part 36 inclines toward the distal end side in the axial direction while decreasing in diameter. Thus, in the insertion state of the capillary tube 8, not only the minimum inner diameter portion in the elastic fitting part 36 but also the wide area of the tapered inner circumferential surface of the projecting distal end portion 36a bent or extended in the axial direction tends to come into close contact with the outer circumferential surface of the capillary tube 8. As a result, a large sealing area can be reliably obtained at the insertion site of the capillary tube 8 into the elastic fitting part 36, thereby further improving the sealing properties with a small abutting force.

Moreover, in the present practical embodiment, the minimum inner diameter portion of the elastic fitting part 36 is a generally circular inner hole smaller than the outer diameter of the capillary tube 8. Therefore, the shape of the inner circumferential surface of the elastic fitting part 36 easily conform to the outer circumferential surface of the capillary tube 8 inserted so as to expand the inner hole of the elastic fitting part 36. Accordingly, the elastic fitting part 36 comes into intimate contact against the outer circumference of the capillary tube 8 about the entire circumference with a generally uniform abutting force, thereby further improving and stabilizing the sealing performance.

Furthermore, when connecting the capillary tube 8, first, the distal end face of the capillary tube 8 comes into contact with the proximal end side face of the elastic fitting part 36, and pushes the elastic fitting part 36 to the distal end side while being accompanied by bending deformation to the distal end side and/or extending deformation in the axial direction of the elastic fitting part 36. Besides, due to increase in the insertion amount of the capillary tube 8, the inner hole of the elastic fitting part 36 is gradually pushed open and deformed to expand. Then, when the amount of expanding deformation of the inner hole of the elastic fitting part 36 becomes large and the capillary tube 8 passes through the elastic fitting part 36, the increase in the insertion amount of the capillary tube 8 is allowed while increase in the amount of elastic deformation of the elastic fitting part 36 is generally stopped.

Therefore, until the capillary tube 8 passes through the elastic fitting part 36, the insertion resistance of the capillary tube 8 gradually increases due to increase in the amount of elastic deformation of extension and expansion of the elastic fitting part 36. Meanwhile, from the moment of passing through the elastic fitting part 36, the insertion resistance is suppressed to a generally constant, small one due to frictional resistance of the elastic fitting part 36 abutting against the outer circumferential surface of the capillary tube 8. Therefore, when the capillary tube 8 is inserted, the user can tell that the capillary tube 8 passes through the elastic fitting part 36 and the supporting and sealing state of the capillary tube 8 by the connecting member 24 is realized, through a tactile feeling due to the change in the operating resistance.

This facilitates the connection work of the capillary tube 8 to the puncturing tool 2, and effectively prevents problems such as damage caused by excessively pushing the capillary tube 8 and leakage of collected blood due to insufficient insertion of the capillary tube 8. In particular, in the present practical embodiment, since the maximum insertion end of the capillary tube 8 is clearly defined by the abutment against the proximal end face 34 of the needle hub 14 and can be felt by the user, the reliability of the connection operation of the capillary tube 8 is further improved. Further, since the proximal end portion of the hollow needle 4 does not protrude from the proximal end face 34 of the needle hub 14, damage due to contact of the capillary tube 8 with the hollow needle 4 can be avoided. However, the capillary tube 8 does not need to be pushed until it comes into abutment against the proximal end face 34.

Figure 4:
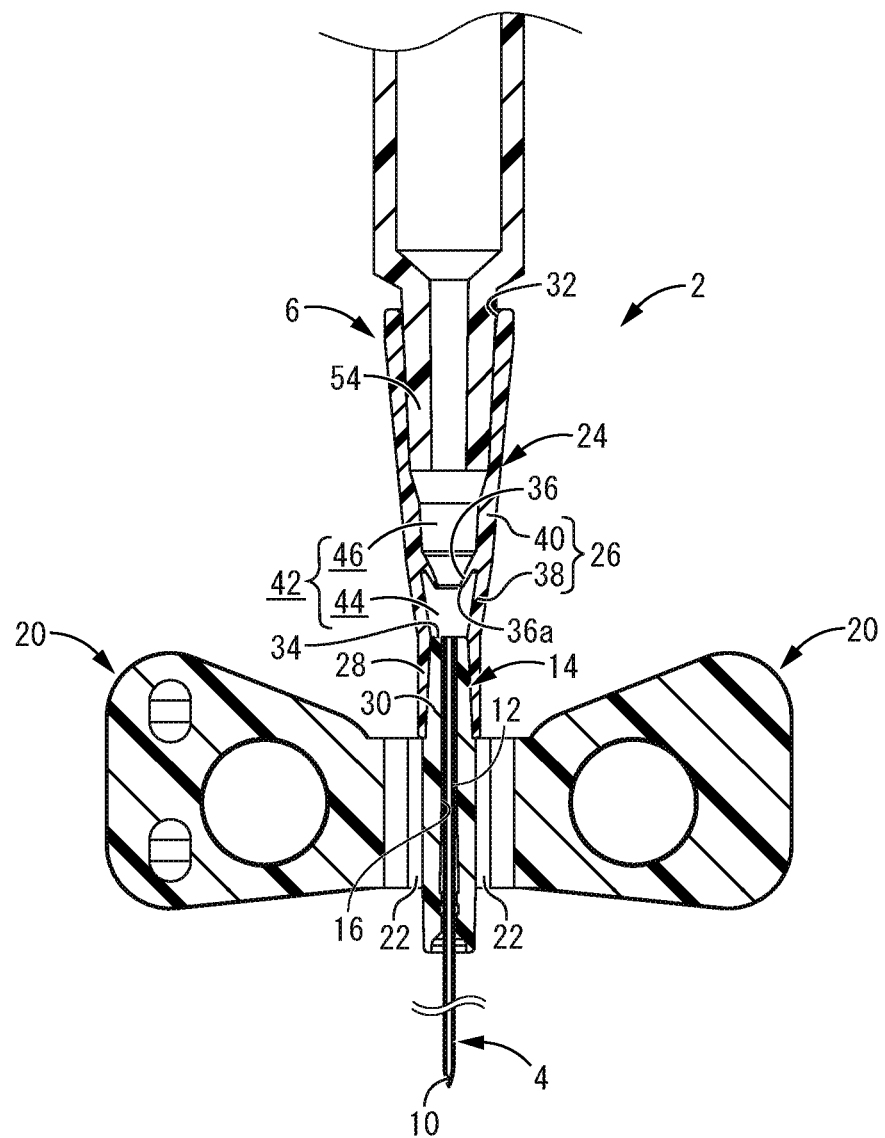
FIG. 4 is a vertical cross-sectional view of the puncturing tool for small animals shown in FIG. 1, showing the connected state of a male luer.

Furthermore, in the puncturing tool 2 of the present practical embodiment, as shown in FIG. 4, the taper angle of the inner surface on the proximal end side of the tapered peripheral wall 26 is set corresponding to the taper angle of the male luer 54, making it also possible to connect the male luer 54 instead of the capillary tube 8. With this configuration, the puncturing tool 2 can also be used to connect a syringe, an external line, or the like to the central hole of the hollow needle 4, so as to perform fluid transfusion on small animals and the like in addition to blood collection from small animals.

Figure 5:
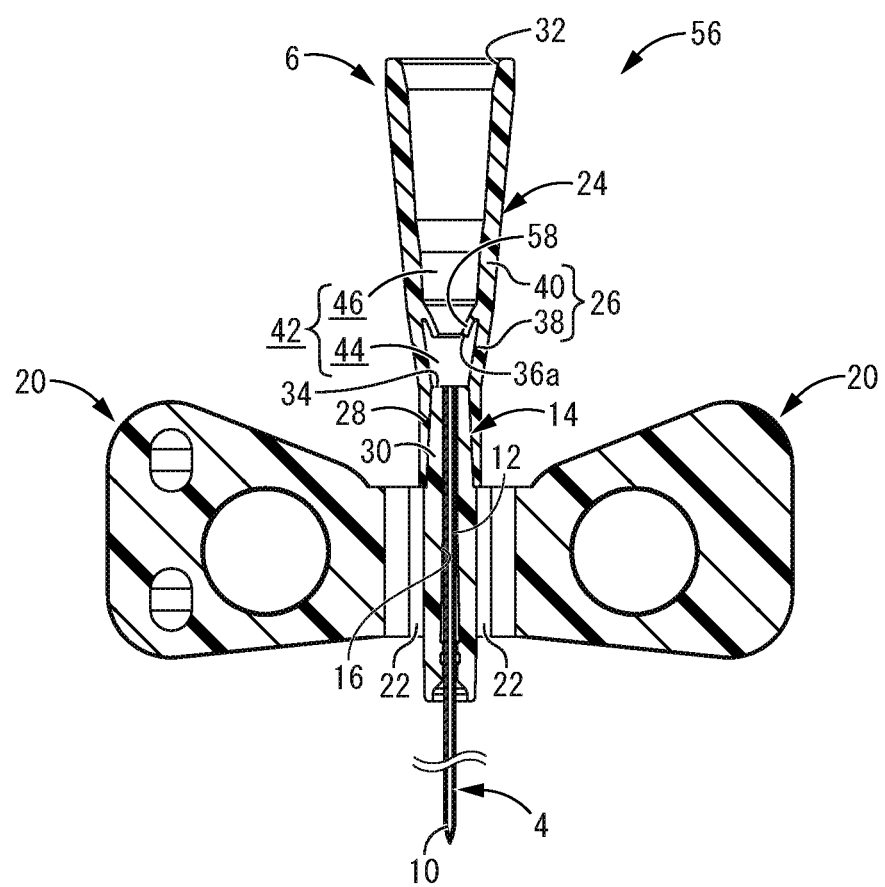
FIG. 5 is a vertical cross-sectional view illustrating another embodiment of an elastic fitting part adopted in the puncturing tool for small animals shown in FIG. 1.

In the puncturing tool 2 of the present practical embodiment, the specific shape of the elastic fitting part 36 may be appropriately changed in consideration of the characteristics of the elastic fitting part 36 such as the elasticity, the suitable size of the capillary tube 8, the required sealing performance, and the tactile feeling of insertion of the capillary tube 8. For example, like a puncturing tool 56 shown in FIG. 5, it is also possible to adopt an elastic fitting part 58 whose thickness dimension is generally constant in the direction of projection from the tapered peripheral wall 26, or the like.

Figure 6:
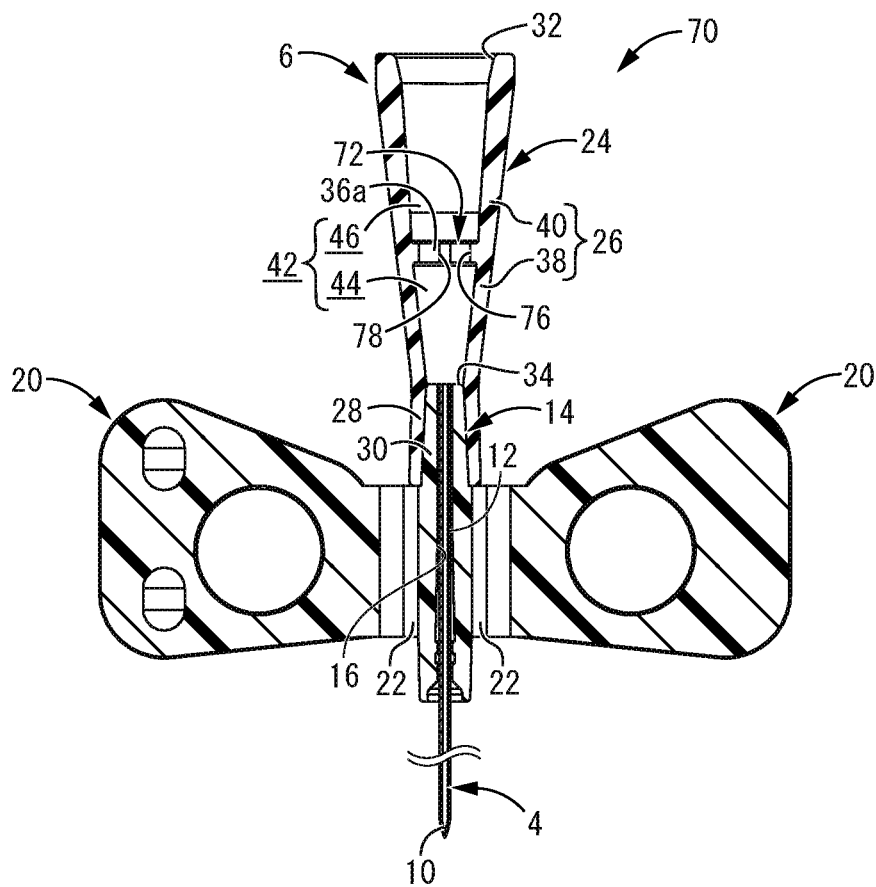
FIG. 6 is a vertical cross-sectional view showing a puncturing tool for small animals according to a second practical embodiment of the present invention, taken along line 6-6 of FIG. 7.
Figure 7:
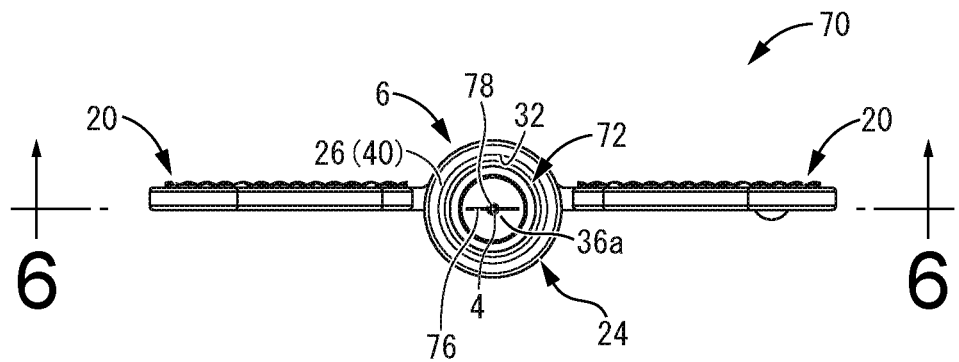
FIG. 7 is a rear view of the puncturing tool for small animals shown in FIG. 6.

Next, FIGS. 6 and 7 show a puncturing tool 70 for small animals according to a second practical embodiment of the present invention. This practical embodiment exemplifies another mode of the connecting member, particularly the elastic fitting part, with respect to the preceding first practical embodiment. In the following description, the members and parts substantially the same as those in the first practical embodiment are designated by the same reference numerals as those in the first practical embodiment in the drawings, and detailed description thereof will be omitted.

An elastic fitting part 72 of the present practical embodiment has a circular disk shape with a generally constant thickness, and extends in the axis-perpendicular direction so as to partition the internal space 42 of the tapered peripheral wall 26.

The elastic fitting part 72 includes a slit 76 penetrating the central portion thereof in the thickness direction, which is the direction of insertion of the capillary tube 8. In the present practical embodiment, the slit 76 has a straight line shape extending linearly in the diametrical direction. Further, a small-diameter circular hole 78 is formed in the center of the elastic fitting part 72 so as to penetrate in the thickness direction. The inner diameter of the circular hole 78 is made smaller than the outer diameter dimension of the suitable capillary tube 8.

The slit 76 is formed in a mode extending from the circular hole 78 on the opposite sides in the diametrical direction. The slit 76 is held in a closed state based on the elasticity of the elastic fitting part 72, while the circular hole 78 is in an open state.

Figure 8:
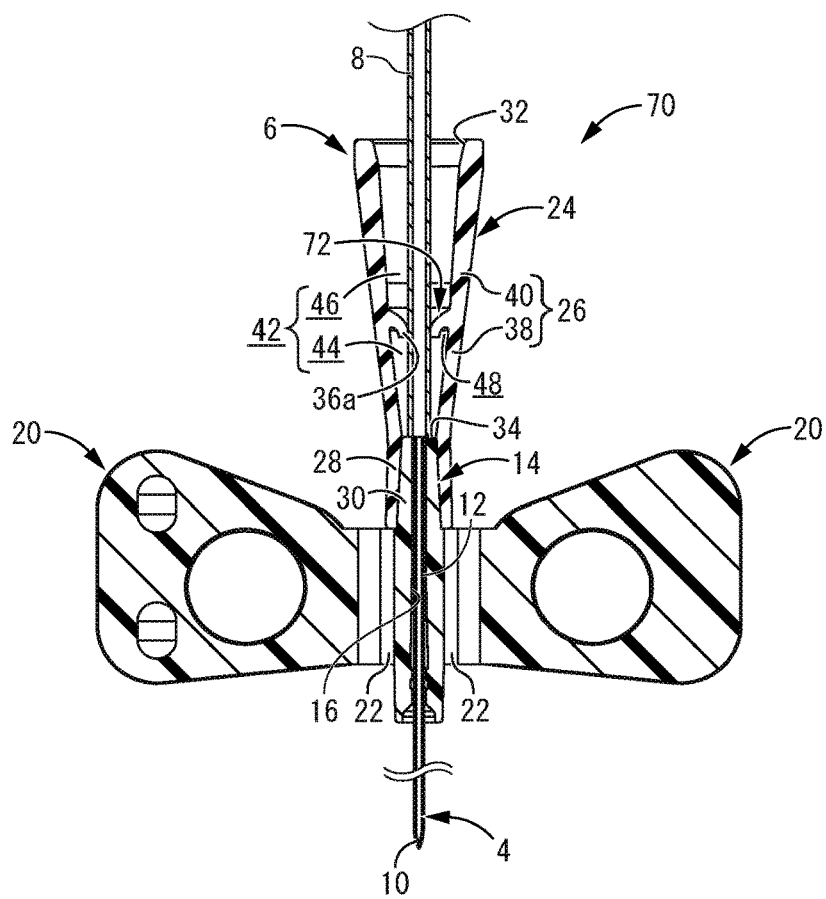
FIG. 8 is a vertical cross-sectional view of the puncturing tool for small animals shown in FIG. 6 which shows the connected state of a capillary tube, taken along line 8-8 of FIG. 9.
Figure 9:
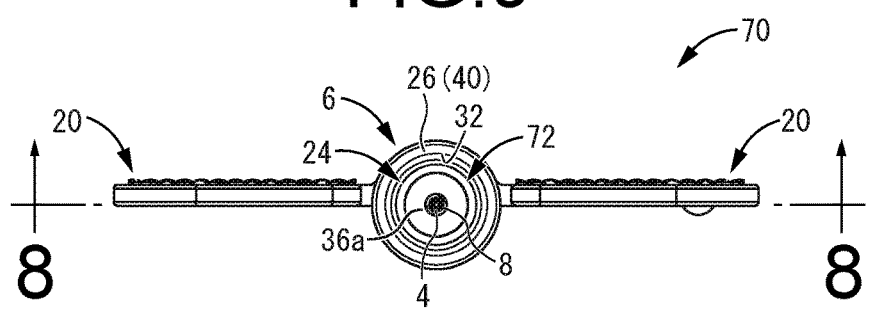
FIG. 9 is a rear view of the puncturing tool for small animals in the connected state of the capillary tube shown in FIG. 8.

FIGS. 8 and 9 show the connection state of the capillary tube 8 to the puncturing tool 70 of the present practical embodiment. In the present practical embodiment as well, as in the first practical embodiment, when the capillary tube 8 is inserted, the distal end face of the capillary tube 8 abuts against the proximal end side face of the elastic fitting part 72, and the elastic fitting part 72 is elastically deformed so as to be pushed to expand to the distal end side. Then, after the slit 76 is opened and the capillary tube 8 passes through, the capillary tube 8 is inserted toward the distal end side while sliding in contact with the elastic fitting part 72. Therefore, similarly to the first practical embodiment, all of the tactile feeling at the time of the connection operation of the capillary tube 8, the sealing properties and the allowance performance with respect to inclination of the capillary tube 8 in the connection state, and the like can be effectively exhibited.

Additionally, in the present practical embodiment, since the circular hole 78 is provided in the center of the slit 76, the elastic fitting part 72 is pushed open and the capillary tube 8 is easily inserted. Furthermore, since the slit 76 is closed in the non-insertion state of the capillary tube 8, by making the circular hole 78 sufficiently small in diameter, the internal space 42 of the capillary tube 8 can be kept in the substantially closed state. Therefore, for example, it would also be possible to insert and connect the capillary tube 8 after puncturing a small animal with the hollow needle 4 of the puncturing tool 70, to detach or exchange the capillary tube 8 with respect to the puncturing tool 70 while puncturing is kept with the capillary tube 8 connected, and the like.

Figure 10:
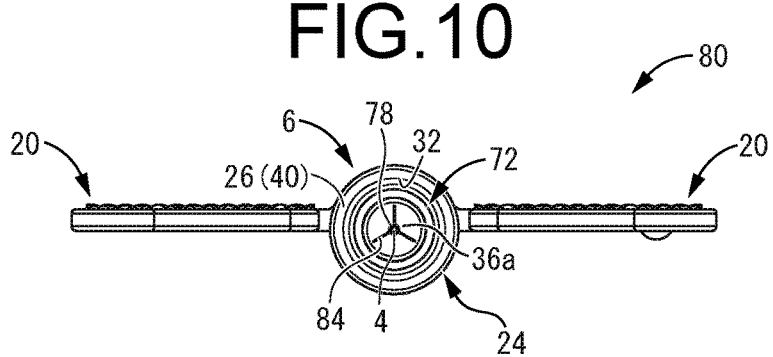
FIG. 10 is a rear view illustrating another embodiment of an elastic fitting part adopted in the puncturing tool for small animals shown in FIG. 6.

Meanwhile, the elastic fitting part 72 of the present practical embodiment may also have a tapered cross-sectional shape whose thickness dimension decreases from the outer peripheral portion toward the central portion or from the outer peripheral portion toward the slit 76. Besides, the number and shape of the slit formed in the elastic fitting part 72 are not limited. For example, like a puncturing tool 80 shown in FIG. 10, three or more slits 84 extending from the center in a spoke-wise fashion in the radial direction may also be adopted. Furthermore, the size and shape of the central through hole formed in the elastic fitting part 72, such as the circular hole 78, are not limited. It would also be acceptable to adopt a through hole having a tapered shape in which the diameter dimension changes in the axial direction, a through hole having a cross-sectional shape in which the diameter dimension varies in the circumferential direction, for example, the diameter dimension is made larger in the slit direction than in other diametrical directions, or the like. Alternatively, such a through hole need not be formed in the center of the elastic fitting part 72.

Although the practical embodiments of the present invention have been described above, the present invention is not limitedly interpreted based on the specific or restrictive description in the practical embodiments and in the summary section, but may be embodied with various changes, modifications and improvements which may occur to those skilled in the art.

For example, the structure in which the male luer 54 can be connected to the proximal end side of the tapered peripheral wall 26 as shown in FIG. 4 need not be adopted in the present invention. Besides, the proximal end face 34 of the needle hub 14 and the proximal end face of the hollow needle 4 may be set at different positions in the axial direction. Furthermore, a needle tip cover that covers the needle tip after removal of the hollow needle 4 can also be adopted as needed. Further, regarding the wing-like part of the needle hub 14, various shapes, sizes, and numbers can be adopted, and the wing-like part may be formed separately from the needle hub 14. It would also be possible not to provide the wing-like part.

Additionally, the elastic fitting part may be made of a different material from that of the tapered peripheral wall, and for example, an elastic fitting part which is softer or has a higher elasticity than the tapered peripheral wall may be adopted. The elastic fitting part made of a different material from that of the tapered peripheral wall can be realized by, for example, integrally molding with the tapered peripheral wall through multicolor molding or insert molding, or incorporating the elastic fitting part formed as a separate member into the tapered peripheral wall by post-fastening. Furthermore, it would also be possible to integrally mold the needle hub 14 and the connecting member 24.

Moreover, in the preceding practical embodiment, the connecting part 6 is constituted by including the tapered peripheral wall 26, but the tubular peripheral wall constituting the connecting part need not be tapered. For example, the tubular peripheral wall constituting the connecting part may be a tubular peripheral wall of round tubular shape having a constant inner diameter dimension and extending in the axial direction. Even when such a tubular peripheral wall is adopted, the technical effect exhibited without being based on the tapered peripheral wall is exhibited in the same manner as in the preceding practical embodiment. Further, the deformation of the elastic fitting part caused by the insertion of the capillary tube and the working effects based on the said deformation can be exhibited regardless of the shape of the peripheral wall of the connecting part.

Furthermore, the tubular peripheral wall may be divided into a distal end side and a proximal end side in the axial direction regardless of its shape, and the divided two sides may have different materials, softness, and the like from each other. Further, the elastic fitting part may be integrally molded with the divided peripheral wall of either or both of the distal end side and the proximal end side.

Besides, in the case where the peripheral wall of the connecting member is tapered, the peripheral wall is not necessarily be tapered across the entire length in the axial direction. For example, it would also be acceptable that only the proximal end side with respect to the elastic fitting part is tapered, and the distal end side attached to the needle hub may have, for example, a straight round tubular shape.

This can facilitate, for example, molding of the connecting member.

Additionally, the shape and structure of the externally fitted assembly portion (the attachment tube) of the distal end portion of the connecting member with respect to the proximal end portion of the needle hub are not limited. For example, the externally fitted assembly portion may have a straight tubular shape, or a tapered tubular shape opposite to that of the preceding practical embodiment. Further, in order to prevent dislodgment or the like, a locking part comprising concave and convex portions may be provided on the fitting surface of the externally fitted assembly portion, and welding or bonding of at least a part thereof is also possible.

KEYS TO SYMBOLS 2, 56, 70, 80: Puncturing tool for small animals, 4: hollow needle, 6: connecting part, 8: capillary tube, 14: needle hub, 24: connecting member, 26: tapered peripheral wall, 32: proximal end opening, 34: proximal end face (abutting face), 36, 58, 72: elastic fitting part, 36a: projecting distal end portion, 44: distal side internal space (deformation allowance space), 76, 84: slit

The invention claimed is:

1. A puncturing tool for small animals comprising:
a hollow needle; and
a connecting part for a capillary tube, the connecting part being on a proximal end side of the hollow needle and having a tapered peripheral wall expanding and extending in a direction away from the hollow needle,
the tapered peripheral wall including an elastic fitting part configured to allow the capillary tube to be inserted, the elastic fitting part projecting inward from a lengthwise middle portion of the tapered peripheral wall, and
a center of the elastic fitting part is held open in a state where the capillary tube is not inserted through the elastic fitting part and the elastic fitting part is not elastically deformed by another member.

2. A puncturing tool for small animals comprising:
a hollow needle; and
a connecting part for a capillary tube, the connecting part being on a proximal end side of the hollow needle and having a tubular peripheral wall extending in a direction away from the hollow needle,
the tubular peripheral wall including an elastic fitting part projecting inward from a lengthwise middle portion of the tubular peripheral wall, a projecting distal end portion of the elastic fitting part that projects inward being configured to be elastically deformed toward a distal end side in an axial direction of the tubular peripheral wall while being expanded by the capillary tube being inserted, and
a center of the elastic fitting part is held open in a state where the capillary tube is not inserted through the elastic fitting part and the elastic fitting part is not elastically deformed by another member.

3. The puncturing tool for small animals according to claim 1, wherein the elastic fitting part inclines toward a hollow needle side and projects inward.

4. The puncturing tool for small animals according to claim 1, wherein the elastic fitting part is tapered toward a projecting distal end side.

5. The puncturing tool for small animals according to claim 1, wherein the elastic fitting part has a slit configured to be pushed to expand by the capillary tube being inserted.

6. The puncturing tool for small animals according to claim 1, wherein an inside of the tapered peripheral wall on a hollow needle side with respect to the elastic fitting part constitutes a deformation allowance space configured to allow entrance of the elastic fitting part deformed by the capillary tube being inserted.

7. The puncturing tool for small animals according to claim 1, wherein an internal volume of the tapered peripheral wall is configured such that an internal volume on a hollow needle side with respect to the elastic fitting part is smaller than an internal volume on a proximal end opening side with respect to the elastic fitting part.

8. The puncturing tool for small animals according to claim 1, wherein a proximal end portion of the hollow needle is provided with a needle hub, while a connecting member formed of a material softer than that of the needle hub is attached to the needle hub, and the connecting member extending from the needle hub to the proximal end side constitutes the connecting part.

9. The puncturing tool for small animals according to claim 8, wherein a proximal end portion of the needle hub is provided with an abutting face configured to define an insertion position of the capillary tube by being abutted by a distal end face of the capillary tube inserted through the elastic fitting part.

10. The puncturing tool for small animals according to claim 2, wherein the elastic fitting part inclines toward a hollow needle side and projects inward.

11. The puncturing tool for small animals according to claim 2, wherein the elastic fitting part is tapered toward a projecting distal end side.

12. The puncturing tool for small animals according to claim 2, wherein the elastic fitting part has a slit configured to be pushed to expand by the capillary tube being inserted.

13. The puncturing tool for small animals according to claim 2, wherein an inside of the tubular peripheral wall on a hollow needle side with respect to the elastic fitting part constitutes a deformation allowance space configured to allow entrance of the elastic fitting part deformed by the capillary tube being inserted.

14. The puncturing tool for small animals according to claim 2, wherein an internal volume of the tubular peripheral wall is configured such that an internal volume on a hollow needle side with respect to the elastic fitting part is smaller than an internal volume on a proximal end opening side with respect to the elastic fitting part.

15. The puncturing tool for small animals according to claim 2, wherein a proximal end portion of the hollow needle is provided with a needle hub, while a connecting member formed of a material softer than that of the needle hub is attached to the needle hub, and the connecting member extending from the needle hub to the proximal end side constitutes the connecting part.

16. The puncturing tool for small animals according to claim 15, wherein a proximal end portion of the needle hub is provided with an abutting face configured to define an insertion position of the capillary tube by being abutted by a distal end face of the capillary tube inserted through the elastic fitting part.

17. The puncturing tool for small animals according to claim 1, wherein inclination and movement of the capillary tube towards the tapered peripheral wall are allowed due to elastic deformation of the elastic fitting part, while maintaining a sealed state between the capillary tube and the elastic fitting part.

18. The puncturing tool for small animals according to claim 2, wherein inclination and movement of the capillary tube towards the tubular peripheral wall are allowed due to elastic deformation of the elastic fitting part, while maintaining a sealed state between the capillary tube and the elastic fitting part.

* * * * *